(12) United States Patent
Tsuge

(10) Patent No.: US 7,591,281 B2
(45) Date of Patent: Sep. 22, 2009

(54) ELECTROMAGNETIC VALVE

(75) Inventor: Shigeto Tsuge, Okazaki (JP)

(73) Assignee: Denso Corporation, Kariya (JP)

( * ) Notice: Subject to any disclaimer, the term of this patent is extended or adjusted under 35 U.S.C. 154(b) by 282 days.

(21) Appl. No.: 11/369,768

(22) Filed: Mar. 8, 2006

(65) Prior Publication Data
US 2006/0207663 A1 Sep. 21, 2006

(30) Foreign Application Priority Data
Mar. 15, 2005 (JP) .............................. 2005-073527

(51) Int. Cl.
F16K 47/02 (2006.01)
F16K 31/06 (2006.01)
(52) U.S. Cl. ...................... 137/495; 251/30.04; 251/48; 251/129.17
(58) Field of Classification Search ................. 137/495, 137/587; 251/30.04, 48, 129.17, 129.19
See application file for complete search history.

(56) References Cited

U.S. PATENT DOCUMENTS

| 5,165,652 | A | * | 11/1992 | Nicolaisen ................... 251/51 |
| 5,601,275 | A | * | 2/1997 | Hironaka ................. 251/129.15 |
| 6,305,665 | B1 | | 10/2001 | Coura et al. |
| 6,581,904 | B2 | * | 6/2003 | Watanabe et al. ...... 251/129.17 |

| 2001/0017160 | A1 | | 8/2001 | Ishigaki et al. |
| 2005/0217734 | A1 | * | 10/2005 | Takakura ................... 137/587 |

FOREIGN PATENT DOCUMENTS

| JP | 58-169285 | 11/1983 |
| JP | 62-162485 | 10/1987 |
| JP | 04-119271 | 4/1992 |
| JP | 2000-18399 | 1/2000 |

OTHER PUBLICATIONS

Japanese Office Acton dated Dec. 16, 2008, issued in counterpart Japanese Application No. 2005-073527, with English translation.

* cited by examiner

Primary Examiner—Stephen M Hepperle
(74) Attorney, Agent, or Firm—Nixon & Vanderhye, PC

(57) ABSTRACT

In an electromagnetic valve, a valve member is slidably installed in a housing to open and close a valve hole. A moving core is slidably installed in the housing, and a coil generates a magnetomotive force to attract the moving core to one side when it is energized. The valve shaft links a motion of the moving core with a motion of the valve member. A bellows surrounds the valve shaft to form a cylindrical inner space between the valve shaft and itself. The bellows is subjected to both positive and negative pressures to extend and shrink in accordance with the motions of the valve member and the moving core. An inner volume of the inner space increasing and decreasing in accordance with extending and shrinking operations of the cylindrical bellows portion. The opening of the bellows and the valve shaft form a narrow opening passage.

6 Claims, 8 Drawing Sheets

ELECTROMAGNETIC VALVE

CROSS REFERENCE TO RELATED APPLICATION

This application is based upon and claims the benefit of priority of Japanese Patent Application No. 2005-073527 filed on Mar. 15, 2005, the content of which is incorporated herein by reference.

FIELD OF THE INVENTION

The present invention relates to an electromagnetic valve having a cylindrical bellows that extends and shrinks in its axial direction and in which a damper effect generated by a narrow opening portion of the bellows reduces an operational noise of a moving core and/or a valve element, and especially relates to the electromagnetic valve such as an electromagnetic tank-sealing valve in which both positive pressure larger than the atmospheric pressure and negative pressure smaller than the atmospheric pressure alternately act onto the valve and bellows.

BACKGROUND OF THE INVENTION

Conventionally, an electromagnetic flow amount control valve (electromagnetic valve) is put forth that is provided with: a housing that has a cylindrical valve seat in which a fluid passage hole is formed; a valve element that is lifted off and seated on the valve seat to open and close the fluid passage hole; a coil that generates magnetomotive force when it is energized; a fixed core that is magnetized by the magnetomotive force of the coil; an electromagnetic driving portion provided with a moving core that is magnetized by the magnetomotive force of the coil to be attracted toward an attracting portion of the fixed core (to one side in an axial direction); and a valve shaft that links an operation of the valve element with an axial reciprocating motion of the moving core of the electromagnetic driving portion. The electromagnetic valve is generally configured so that moving elements (the moving core, the valve shaft and the valve element) moves to the one side in the axial direction until they come in contact with a stopper that is provided in the fixed core when the magnetomotive force of the coil attracts the moving core toward the attracting portion of the fixed core. In the electromagnetic valve, when the coil stops being energized and the magnetomotive force extinguishes, an urging force of a spring, which is provided in the electromagnetic driving portion, pushes the moving elements backward to the other side in the axial direction to seat the valve element on the valve seat of the housing.

Accordingly, the electromagnetic valve has such an issue that the moving core and the valve element generate operational noises of when the moving elements come in contact with the stopper or the valve seat in both a valve-opening operation time and a valve-closing operation time. In this regard, U.S. Pat. No. 6,581,904-B2, for example, discloses a method to reduce the operational noise of the electromagnetic valve by using a damper effect. In this method, a fitting portion of a diaphragm, which is formed from thin elastic body, is fixed to an outer circumference of the valve shaft, and a radially outer end portion of the diaphragm is supported by being sandwiched between the housing and an end face of the electromagnetic driving portion. Thus, an inner space of the housing, which is formed between the end face of the electromagnetic driving portion and the valve seat of the housing, is airtightly partitioned into a first pressure chamber at a side of the valve seat of the hosing and a second pressure chamber at a side of the electromagnetic driving portion. The first pressure chamber has a construction to flow control fluid therethrough, and the second pressure chamber is filled with gas.

In the valve-opening operation time of the electromagnetic valve, the gas in the second pressure chamber, which is pressurized in accordance with a shrinkage of the diaphragm, is subjected to a passage resistance in passing from the second pressure chamber through an orifice that is provided at the side of the electromagnetic driving portion. Thus, the damper effect by the passage resistance decreases a traveling speed of the moving core to the one side in the axial direction, to reduce the operational noise of the electromagnetic valve due to the moving core coming in contact with the stopper. Further, in the valve-closing operation time of the electromagnetic valve, the damper effect by the passage resistance decreases the traveling speed of the moving core to the other side in the axial direction, to reduce the operational noise of the electromagnetic valve due to the valve element seating on the valve seat of the housing.

It is considered to apply the electromagnetic valve according to U.S. Pat. No. 6,581,904-B2 to an electromagnetic valve that is subjected to both the positive pressure and the negative pressure acting on an outer surface of an elastically deforming portion of the diaphragm. In this case, the elastically deforming portion is alternately deformed into a protruding shape and into a depressed shape by the alternate positive and negative pressures acting on the outer surface of the elastically deforming portion of the diaphragm. Thus, the durability of the elastically deforming portion decreases, so that a crack may generate on the diaphragm to tear the diaphragm. It is considered to increase the thickness of the elastically deforming portion of the diaphragm to prevent the degradation and the breakage of the elastically deforming portion that is incorporated in the electromagnetic valve. However, the hard elastically deforming portion is not easily deformed, to decrease a control response performance of the electromagnetic valve. It is also considered to increase a radius of the elastically deforming portion, however, the dimensions of the housing must be changed in accordance with the upsizing of the diaphragm, and this decreases the mountability of the electromagnetic valve in an engine room of the vehicle and the like.

In this regard, JP-2000-018399-A, for example, discloses an electromagnetic valve provided with a bellows (bellowphragm) that can be used in both the positive and negative pressures. The bellows of this electromagnetic valve has a cylindrical bellows portion that surrounds the valve shaft. A motion of the cylindrical bellows portion is linked with the axial reciprocating motion of the moving core of the electromagnetic driving portion, so that the cylindrical bellows portion extends and shrinks in the axial direction in accordance with the axial reciprocating motion of the moving core of the electromagnetic valve. One end of the bellows in the axial direction of the valve shaft, which is at the side of the electromagnetic driving portion, is opened, and the other end of the bellows in the axial direction of the valve shaft, which is at the side of the valve seat of the housing, is closed. A valve element is integrally provided in the closed portion at the other end of the bellows, to be seated on and lifted off the valve seat of the housing to close and open the valve hole. A communication passage is formed in the valve element to communicate an inner space of the cylindrical bellows portion with an outer space of the cylindrical bellows portion, that is, with a fluid passage at an upstream side than the valve seat of the housing.

Accordingly, the bellows in this conventional electromagnetic valve has such a construction that a total volume in a plurality of partitioned spaces, which increases and decreases in accordance with the extending and the shrinking operations of the cylindrical bellows portion, is quite small relative to the whole volume in the inner space in the cylindrical bellows portion that is formed between an inner circumferential face of the cylindrical bellows portion and an outer circumferential face of the valve shaft. Thus, when the cylindrical bellows portion of the bellows shrinks in accordance with a displacement of the moving core and the valve shaft to the one side in the axial direction, the fluid filled in the inner space of the cylindrical bellows portion is discharged at a stroke through the communication passage to the side of the fluid passage, to cause an issue that the electromagnetic valve does not generate enough damper effect as in the above-mentioned electromagnetic valve provided with the diaphragm.

SUMMARY OF THE INVENTION

The present invention is achieved in view of the above-described issues, and has an object to provide an electromagnetic valve that can decrease an operational noise by a damper effect in an axial extending and shrinking motion of the cylindrical bellows portion of the bellows without decreasing an endurance and reliability and increasing a size thereof.

The electromagnetic valve has a housing, a valve member, an electromagnetic driving portion, a valve shaft and a bellows member. The valve member is installed in the housing to be slidable in an axial direction of the housing to open and close a valve hole. The electromagnetic driving portion is provided with a moving core that is installed in the housing to be slidable in the axial direction and a coil that generates a magnetomotive force to attract the moving core to one side in the axial direction of the housing when it is energized. The valve shaft links a reciprocating motion of the moving core in the axial direction with a motion of the valve member. The bellows member is installed in the housing to surround an outer circumference of the valve shaft and provided with a cylindrical bellows portion that extends and shrinks in the axial direction in accordance with an opening and closing operations of the valve member and with the reciprocating motions of the moving core, and a surface of the cylindrical bellows portion being subjected to both positive and negative pressures.

The cylindrical bellows portion and the valve shaft form a cylindrically shaped inner space therebetween, an inner volume of the inner space increasing and decreasing in accordance with extending and shrinking operations of the cylindrical bellows portion. The bellows member has an opening portion that communicates the inner space of the cylindrical bellows portion with an outer space of the cylindrical bellows portion. The opening portion of the bellows member and the valve shaft form a narrow opening passage, a passage cross-sectional area of the narrow opening passage being quite smaller than a maximum passage cross-sectional area of the inner space of the cylindrical bellows portion.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
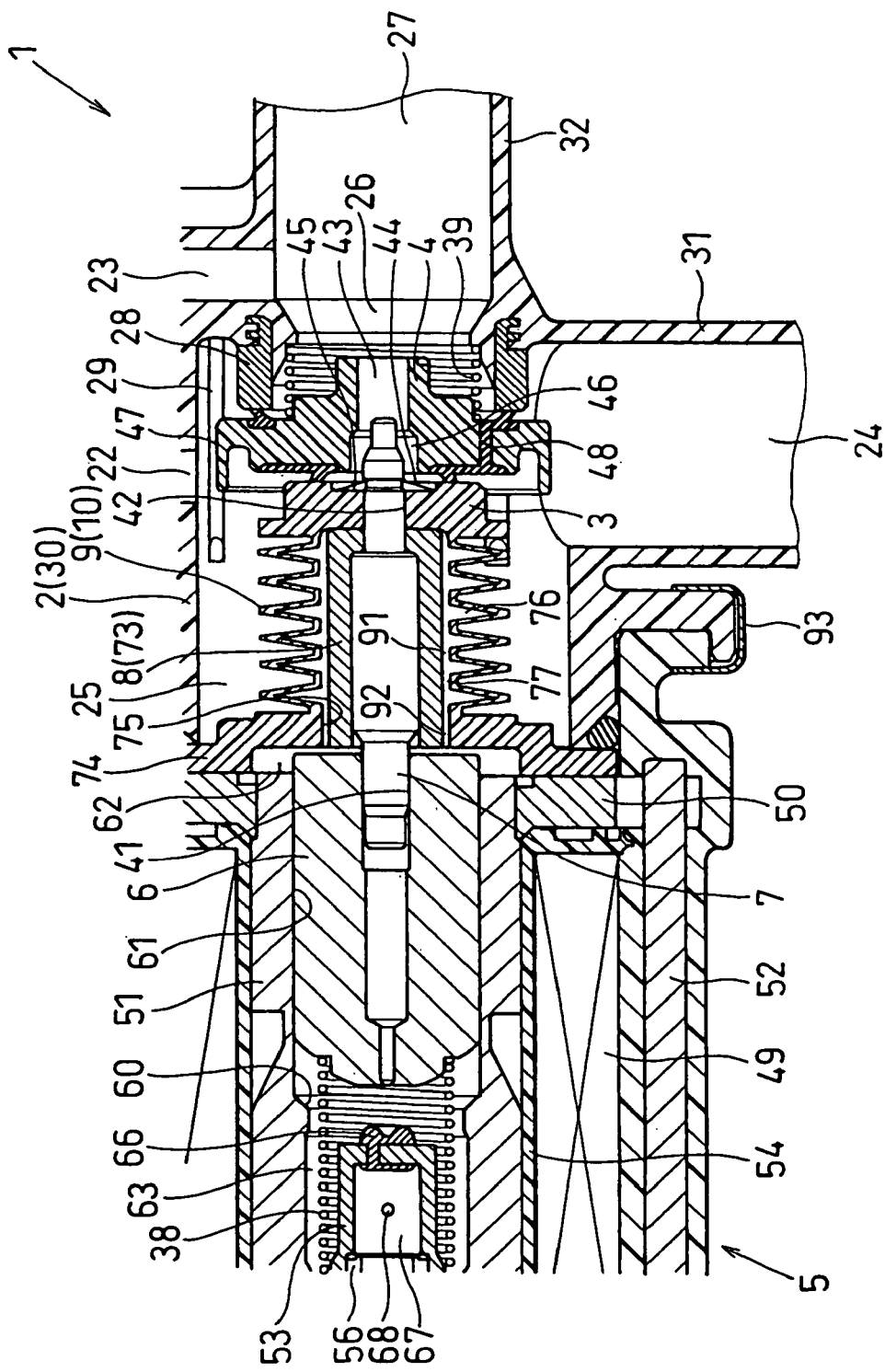
FIG. 1 is a cross-sectional view showing a principal portion of an electromagnetic valve according to a first embodiment of the present invention.
Figure 2:
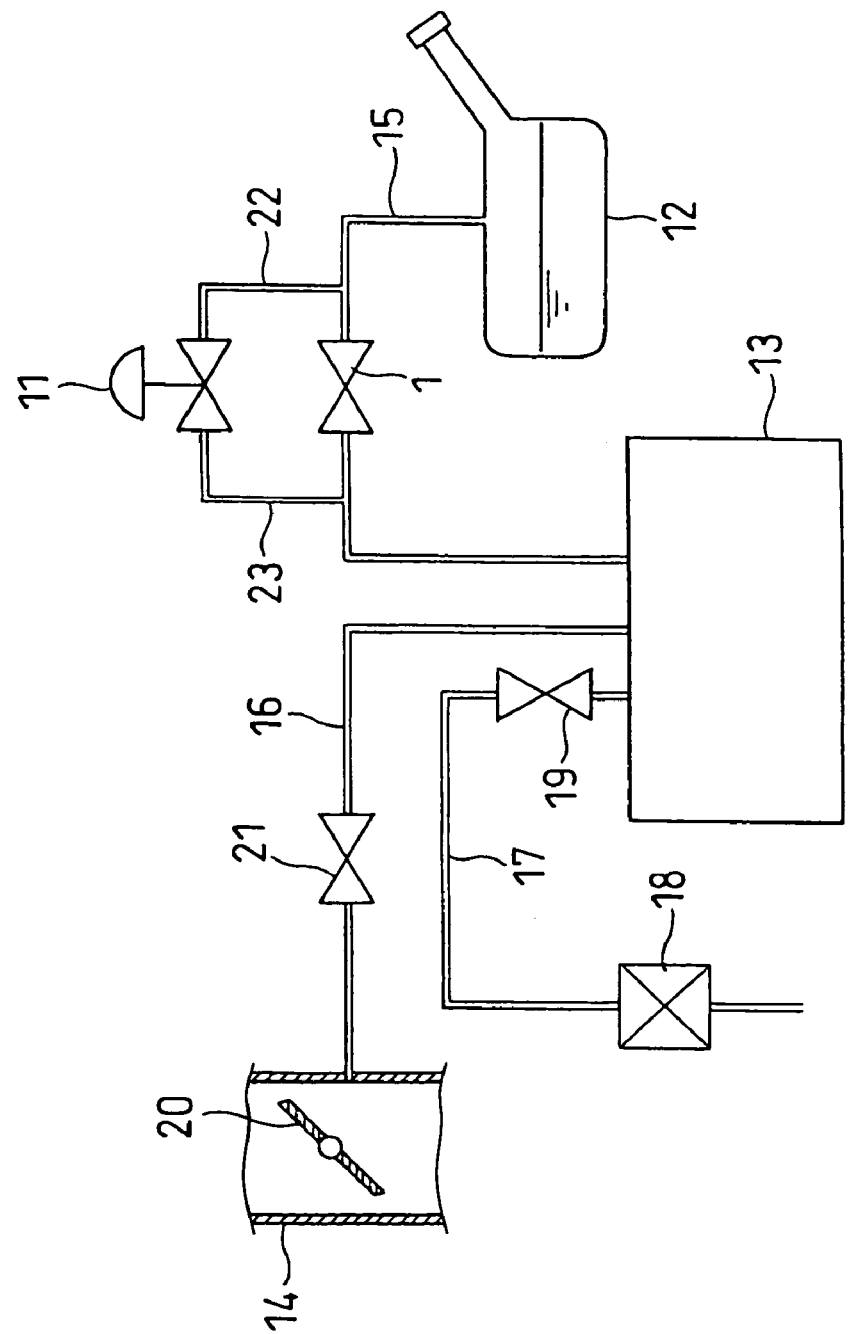
FIG. 2 is a schematic view showing an entire construction of an evaporative emission control system including the electromagnetic combination valve according to the first embodiment.
Figure 3:
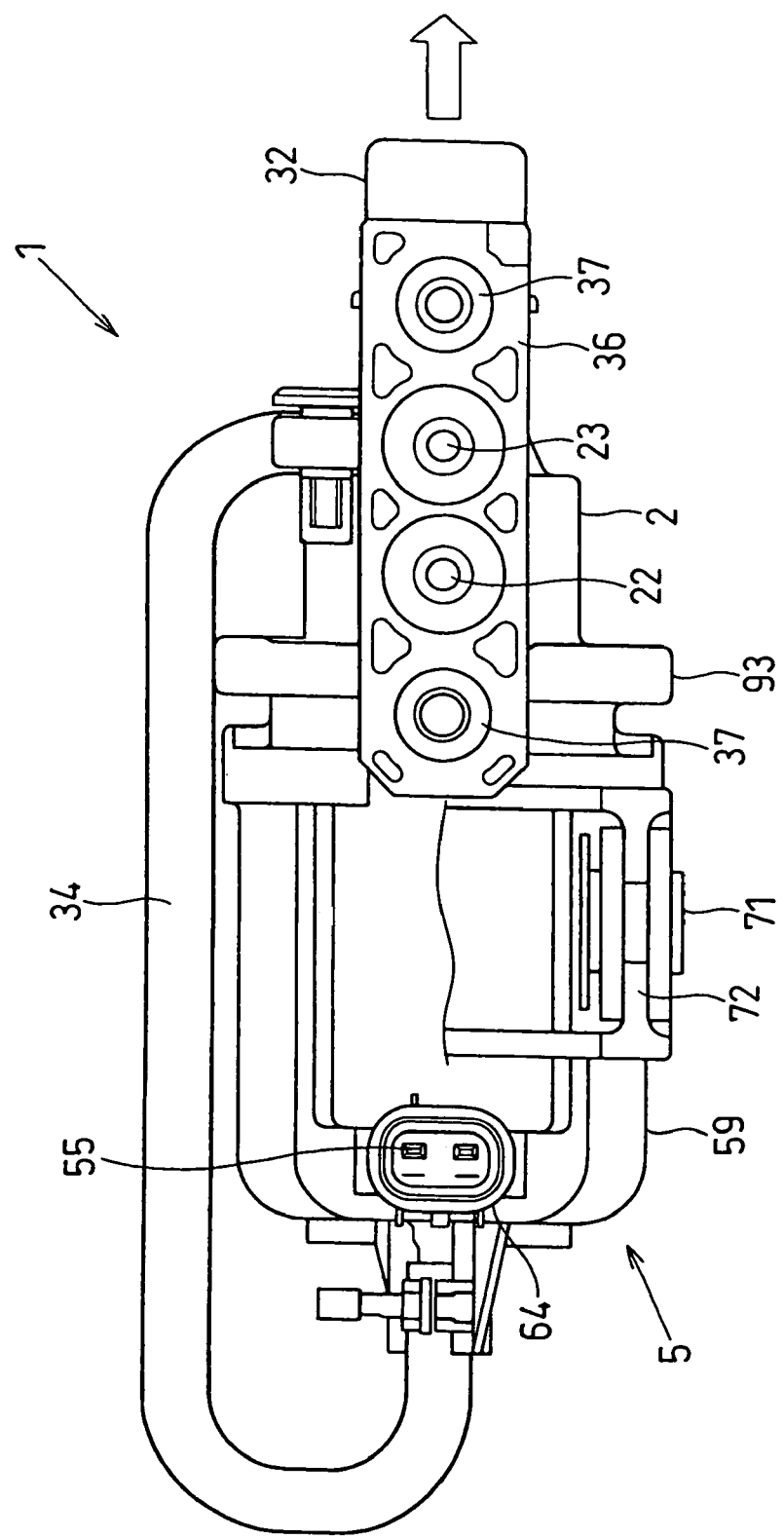
FIG. 3 is a top view showing an entire construction of the electromagnetic valve according to the first embodiment.

In the following embodiments of the present invention, an object of the present invention to reduce the operational noise of the electromagnetic valve is realized by providing a cylindrical bellows portion of the bellows, which is installed in the electromagnetic valve to extend and shrink in an axial direction, with a damper effect. Then, another object of the present invention to secure the damper effect without decreasing durability nor upsizing the electromagnetic valve against both positive and negative pressures, which act on surfaces of ridge and trough portions of the cylindrical bellows portion of the bellows, is realized by providing the damper effect in the extending and shrinking motions of the axial cylindrical bellows portion of the bellows in the electromagnetic valve.

First Embodiment

In a first embodiment of the present invention, an electromagnetic valve 1 is incorporated in an evaporative emission control system together with a relief valve 11. The electromagnetic valve 1 serves as an electromagnetic tank-sealing valve. The electromagnetic tank-sealing valve includes a normally-closed electromagnetic opening/closing valve, which opens for a predetermined period while the vehicle is traveling and at a time just before a fuel tank 12 is refueled and closes at all other times, and a pressure-operated pressure control valve (pressure-sensing valve). The evaporative emission control system is a vaporized fuel (evaporated gas) fly-off prevention system that prevents fluid such as vaporized fuel from flying off into the atmosphere by recovering the fluid such as vaporized fuel, which is vaporized (volatilized) in the fuel tank 12 of the vehicle, through a canister 13 into an engine intake pipe 14 of an internal combustion engine (hereinafter referred to as engine) such as a gasoline engine, which has negative pressure in the engine intake pipe 14. That is, the evaporative emission control system purges the vaporized fuel in emission gas.

In the evaporative emission control system, a connection pipe 15 communicates the fuel tank 12 with the canister 13, and another connection pipe 16 communicates the canister 13 with the engine intake pipe 14. The fuel tank 12 is provided with an in-tank pressure sensor (not shown) to detect an in-tank pressure in the fuel tank 12. In the canister 13 is installed adsorbent such as activated carbon to adsorb the fluid such as vaporized fuel. A vent pipe 17 is connected to a vent hole of the canister 13. On the way of the vent pipe 17 are provided: a filter 18 that filtrates the gas flowing into the canister 13; and a canister control valve 19 that is a normally-opened electromagnetic opening/closing valve that closes the vent hole of the canister 13 as demanded. The filter 18 passes the gas flowing from an inlet portion (the vent hole) of the vent pipe 17 and traps foreign matters contained in the gas to prevent the foreign matters from entering into the engine intake pipe 14.

Further, in the engine intake pipe 14 is installed a throttle valve 20 that adjusts an amount of intake gas fed to an intake gas passage communicated with respective combustion chambers of the engine. On the way of the connection pipe 15 is installed a tank-sealing valve unit including the electromagnetic valve 1 and the relief valve 11. On the way of the connection pipe 16 is installed a purge control valve 21 that adjusts purge amount of the fluid such as vaporized fuel. The connection pipe 16 is connected with the engine intake pipe 14 at a position downstream the throttle valve 20 in the airflow direction of the intake gas (at the side of an intake port of the engine). The leakage of the fluid such as vaporized fuel is checked in accordance with the following procedure. Firstly, the canister control valve 19 closes the vent hole of the canister 13. Next, the purge control valve 21 opens to introduce the negative pressure in the engine intake pipe 14 to the connection pipes 15, 16, and then the purge control valve 21 closes to completely interrupt the fluid such as vaporized fuel. After a predetermined period of time is elapsed after the purge control valve 21 is closed, the in-tank pressure sensor detects the in-tank pressure in the fuel tank 12 to detect the in-tank pressure is increased or not, to check the leakage of the fluid such as vaporized fuel.

The relief valve 11 is a pressure adjustment valve that opens when the pressure at the side of the fuel tank 12 is large enough relative to the pressure at the side of the canister 13. The relief valve 11 is formed from: valve holes (not shown) that is provided between bypass flow passages 22, 23 to detour a first and a second valves 3, 4 of the electromagnetic valve 1; a valve element (not shown) that opens and closes the valve holes; a diaphragm (not shown) that drives the valve element in the valve-opening direction; a spring (not shown) that urges the valve element in the valve-closing direction; and so on. The valve holes are formed in the valve body of the relief valve 11. The valve element is slidably installed in the valve body of the relief valve 11 in an axial direction of a valve shaft. The pressure at the side of the canister 13, that is, a standard pressure acts onto a first pressure chamber in a casing, which is partitioned by the diaphragm. The pressure at the side of the fuel tank 12 acts onto the second pressure chamber in the casing, which is partitioned by the diaphragm.

In the following is described a construction of the electromagnetic valve 1 according to the first embodiment, referring to FIGS. 1 to 4.

The electromagnetic valve 1 includes: the first and second valves 3, 4 that are installed in a housing 2 to be able to open and close; an electromagnetic driving portion 5 that drives the first valve to a side to be opened; a valve shaft 7 that links a reciprocating motion of a moving core 6 of the electromagnetic driving portion 5 in the axial direction at least with the opening and closing operations of the first valve 3 in the axial direction; and a bellow-like shaped bellows member 9 that extends and shrinks in the axial direction of the valve shaft 7.

In the first embodiment, the valve shaft 7 is provided with: a metallic shaft that links the reciprocating motion of the moving core 6 in the axial direction at least with the opening and closing operations of the first valve 3 in the axial direction, and with the extending and shrinking operations of a cylindrical bellows portion 10 of the bellows member 9 in the axial direction; and a sleeve-shaped retainer 8 that is fitted on an outer circumference of the metallic shaft to decrease a passage cross-sectional area of an inner space of the bellows member 9. The metallic shaft of the valve shaft 7 corresponds to the metallic part and to the shaft part according to the present invention. The retainer 8 of the valve shaft 7 corresponds to the resinous part, the cylindrical part and an aperture-forming member according to the present invention.

The housing 2 is integrally formed from thermoplastic resin such as polyphenylene sulfide (PPS), polybutylene telephthalate (PBT) or polyamide resin (PA), for example. The housing 2 forms a tank-side fluid passage 24, a valve chamber (bellows chamber) 25, a valve hole (fluid passage hole) 26 and a canister-side fluid passage 27 therein. The tank-side fluid passage 24, the valve chamber 25, the valve hole 26 and the canister-side fluid passage 27 form a fluid-introducing passage that introduces fluid such as vaporized fuel from an inside of the fuel tank 12 to an inside of the canister 13. The tank-side fluid passage 24 and the canister-side fluid passage 27 are connected to the valve chamber 25 and the valve hole 26 in L-shaped manner, Y-shaped manner or T-shaped manner.

In the housing 2 are integrally formed: a cylindrical portion 30 that is airtightly fitted to a cylindrical connection portion of a resin molded member of the electromagnetic driving portion 5, which is described below, to interpose a seal member such as an O-ring therebetween; an approximately pipe-shaped fluid flow pipe (inlet pipe) 31 that extends radially outward from the cylindrical portion 30; and an approximately pipe-shaped fluid flow pipe (outlet pipe) 32 that extends from the cylindrical portion 30 in the axial direction. The cylindrical portion 30 and the fluid flow pipes 31, 32 are formed from resinous material.

The fluid flow pipe 31 is connected via an upstream portion of the connection pipe 15 to the fuel tank 12, and the tank-side fluid passage 24, which includes the inlet port, is formed in the fluid flow pipe 31. The fluid flow pipe 32 is connected via a downstream portion of the connection pipe 15 to the canister 13, and the canister-side passage 27, which includes the outlet port, is formed in the fluid flow pipe 32.

An inner circumferential portion of a connection portion of the fluid flow pipe 32 and the cylindrical portion 30 of the housing 2, that is, a ring-shaped partition wall partitioning the valve chamber 25 and the canister-side fluid passage 27 from each other is provided with a cylindrical valve seat to seat the second valve 4 thereon. The valve seat of the housing 2 has a valve seat portion 28 to seat the second valve 4 thereon. The valve seat portion 28 is formed from metallic material such as stainless steel and the like. The valve seat portion 28 is insert molded on a cylindrical wall portion, which cylindrically protrudes from an end face of a partition wall toward the electromagnetic driving portion. In the valve seat portion 28 is formed the valve hole 26, which communicates the valve chamber 25 with the canister-side fluid passage 27 and is opened and closed by the second valve 4. An inner circumferential face of the cylindrical portion 30 of the housing 2 is provided with a valve-sliding portion that slidably supports an outer circumferential face of a radially outermost face of the second valve 4. The valve-sliding portion is formed from a plurality of valve guides (protruding rib portions) 29. The number of the valve guides is six in the first embodiment.

An upper side portion (in the drawing) of the housing 2 with respect to the valve seat of the cylindrical portion 30 is integrally formed a bracket 33, which is for fixing the valve body of the relief valve 11. In the bracket 33 is formed the bypass flow passage 22, which communicates the valve chamber 25 with a valve hole of the relief valve 11 and the second pressure chamber, and the bypass flow passage 23, which communicates the canister-side fluid passage 27 with the valve hole of the relief valve 11 and the first pressure chamber. A pressure release hole 35 opens on the way of the bypass flow passage 23 to communicate the inner space of the bellows member 9 with the canister-side fluid passage 27 via the inner space of the electromagnetic driving portion 5 and a hose 34. The bracket 33 is provided with an attachment stay portion 36 for fixing the relief valve 11. In the attachment stay portion 36 is insert molded an insert nut 37, which is screw-fastened with a fastening bolt to screw-fasten the valve body of the relief valve 11.

The first valve 3 is integrally formed from resinous material such as thermoplastic resin of fluorocarbon resin, polytetrafluoroethylene (PTFE) and the like. The first valve 3 is coupled to and driven by the moving core 6 of the electromagnetic driving portion 5 via the valve shaft 7. The first valve 3 is provided to be able to reciprocate in the approximately cylindrically shaped valve chamber 25, which is formed between the electromagnetic driving portion 5 and the housing 2, in the axial direction. A second fitting bore 42 is provided on a central axis of the first valve 3. The other axial end portion (right end portion in the drawing) of the valve shaft 7 is press-fitted into the second fitting bore 42. In the first embodiment, the first valve 3 is integrally formed from resinous material on the other axial end portion of the bellows member 9.

The first valve 3 acts as a valve element of a normally-closed electromagnetic valve that opens by being moved by the magnetomotive force of a solenoid coil 49 to the one side in the axial direction. In the valve-opening operation time of the first valve 3, the first valve 3 is lifted off a rubber seat portion of the second valve 4, which is described below, to open a communication passage 43 that penetrates the second valve 4 in the axial direction. In a valve-closing operation time of the first valve 3 when the magnetomotive force of the solenoid coil 49 is extinguished, the spring force of a return spring 38 of the electromagnetic driving portion 5 moves the first valve 3 to the other side in the axial direction to be seated on the rubber seat portion of the second valve 4 to close the communication passage 43.

The first valve 3 is supported by being sandwiched between an annular end face of a retainer 8 and an end face of a wave washer 44. As the wave washer 44, it is possible to adopt a snap washer (or an annular elastic body such as an annular leaf spring) that has a spring function to push the first valve 3 onto the annular end face of the retainer 8. A portion of the first valve 3, with which the wave washer 44 comes in contact, is an annular depressed portion 45 that is slightly depressed from the annular end face on the right side of the first valve 3, that is, from a resinous valve seat portion to be seated on the valve seat portion of the second valve 4.

The second valve 4 is formed from resinous material such as thermoplastic resin of polybutylene terephthalate (PBT), polyphenylene sulfide (PPS), polyamide resin (PA) and the like. The second valve 4 can reciprocate in the valve chamber 25 in the axial direction, as the first valve 3 does. When the first valve 3 opens and the pressure at the side of the fuel tank 12 (the pressure in the tank-side fluid passage 24 and in the valve chamber 25) decreases to a predetermined value, the spring force of a coil spring 39 moves the second valve 4 to the one side in the axial direction to open the second valve 4. The second valve 4 acts as a valve element of a pressure-sensing valve in this manner. In the valve-opening operation time of the second valve 4, the second valve 4 is lifted off the valve seat of the housing 2, to open the valve hole 26.

In the valve-closing operation time of the first valve 3, the spring force of the return spring 38 moves the second valve 4 together with the first valve 3 to the other side in the axial direction to close the second valve 4 to be seated on the valve seat of the housing 2 to close the valve hole 26. The coil spring 39 is a valve urging means that generates urging force (spring load) to urge the second valve 4 to the one side in the axial direction toward the first valve to close the second valve 4. One axial end of the coil spring 39 is engaged with a valve-side hook of the second valve 4. The other axial end of the coil spring 39 is supported by a housing-side hook of the housing 2, which is provided at a proximity to the valve seat.

A communication passage 43 is formed in an inner circumferential portion of a center portion of the second valve 4 to communicate an annular end face on the left side of the second valve 4 and another annular end face on the right side of the second valve 4. The communication passage 43 is a round hole formed on the central axis of the second valve 4 and acting as a communication passage communicated with the fluid passage hole. When the first valve 3 is opened and the second valve 4 is still seated on the valve seat portion 28 of the housing 2, the communication passage 43 communicates the valve chamber 25, which is positioned at an upstream side of the fluid than the valve seat of the housing 2, with the valve hole 26 inside the valve seat of the housing 2, and with the canister-side fluid passage 27, which is positioned at a downstream side of the fluid than the valve seat of the housing 2.

In the first embodiment, an upstream end of the communication passage 43 opens on a bottom face of a round depressed portion 46 that has a diameter larger than a diameter of the communication passage 43. The depressed portion 46 can be prevented from being interfering with a leading end portion (the other axial end portion) of the valve shaft 7. Further, a fitting portion (protruding rib portion) 47 is integrally formed on the outer circumferential portion of the second valve 4 to be slidably fitted to a plurality of the valve guides 29 of the housing 2. The fitting portion 47 has an approximately cylindrical shape to protrude radially outward from the outer circumferential face of the second valve 4. In the first embodiment, the fitting portion 47 fitted to the inner circumferential faces of a plurality of the valve guides 29 to provide a predetermined clearance to be able to move relative to the cylindrical portion 30 of the housing 2. Accordingly, the outer circumferential face of the radially outermost portion of the fitting portion 47 of the second valve 4 is slidably supported by a valve-sliding portion of the cylindrical portion 30 of the housing 2, especially by the inner circumferential faces of a plurality of the valve guides 29.

A ring-shaped first circumferential groove is formed on the left annular end face of the second valve 4, which is a pressure-receiving face, and a ring-shaped second circumferential groove is formed on the right annular end face of the second valve 4, which is a face opposite from the pressure-receiving face. A molded rubber (seal rubber) 48, which is formed from rubber elastic body such as fluorine rubber or silicone rubber, is rubber molded (mold formed) or rubber printed on both end faces of the second valve 4 and in the second valve 4. The molded rubber 48 has: a ring-shaped rubber seat portion, which is mold formed in the first circumferential groove to serve as a valve seat portion to seat the first valve 3 thereon; a ring-shaped rubber seal portion that is mold formed in the second circumferential groove to serve as a valve seat portion to seat on the valve seat of the housing 2; the rubber filled portion that is filled in the second valve 4; and so on.

The electromagnetic driving portion 5 is an electromagnetic actuator including: the moving core 6 that moves the first valve 3 and the valve shaft 7 to the valve-opening side; the return spring 38 that urges the first and second valves 3, 4, the moving core 6 and the valve shaft 7 to the valve-closing side; the solenoid coil 49 that attracts the moving core 6 to the one side in the axial direction; a fixed core that is magnetized when the solenoid coil 49 is energized; and a resin molded member 59 that coats and protects coil assembly including the solenoid coil 49. In the first embodiment, the fixed core is formed from a magnetic plate 50, a stator core 51, a yoke 52 and so on, however, the fixed core may be formed only from the stator core 51. Further, the fixed core may be formed by combining the stator core 51 with any one of the magnetic plate 50 and the yoke 52.

The moving core 6 forms a magnetic circuit together with the solenoid coil 49, the magnetic plate 50, the stator core 51 and the yoke 52. The moving core 6 is formed from a magnetic material into a cylindrical shape. The moving core 6 is magnetized to be an electromagnet when the solenoid coil 49 is energized, to be attracted to an attracting portion 60 of the stator core 51. Thus, the moving core 6 moves to the one side in the axial direction together with the first valve 3 and the valve shaft 7. A first fitting bore is provided on a central axis of the moving core 6. The one end portion of the valve shaft 7 in the axial direction is pres-fitted into a first fitting bore 41. An outer circumference of the moving core 6 (sliding portion) is installed in and supported by a sliding bore 61 of the stator core 51 to provide a specific clearance to allow the moving core 6 to slide smoothly. The clearance also serves as a cylindrical air passage that straightly extends from an air passage 62 that is provided at the opening portion of the stator core 51 to a spring chamber 63 that is provided at a proximity to the attracting portion 60 of the stator core 51. One end of the return spring 38 is supported by a step portion that is provided on a side wall portion of a cylindrical piece 53 press-fitted in the stator core 51, and the other end of the return spring 38 is supported by the left end face of the moving core 6.

The solenoid coil 49 generates magnetomotive force when energized to magnetize respective magnetic bodies including the moving core 6, the magnetic plate 50, the stator core 51 and the yoke 52 to drive the first valve 3, the valve shaft 7 and the moving core 6 to their valve-opening sides. The solenoid coil 49 is an insulated wire repeatedly wound between a pair of flange portions of a coil bobbin 54, which is installed in a cylindrical coil installation portion formed between the stator core 51 and the yoke 52. The solenoid coil 49 has a coil portion that is repeatedly wound on an outer circumference of the coil bobbin 54, and a pair of terminal lead wires that is led from the coil portion. A resin molded member 59, which acts as a resin case, coats and protects an outer circumference of the coil portion of the solenoid coil 49. A pair of the terminal lead wires of the solenoid coil 49 are electrically connected to a pair of external connection terminals 55, which are electrically connected to an outer electric power source or an electromagnetic valve driving circuit, by caulking, welding and the like. Leading end portions of the terminals 55 are exposed in a connector shell 64 of a male connector portion of the resin molded member 59, and serve as connector pins that are inserted into and electrically connected with a female connector portion at a side of the outer electric power source or the electromagnetic valve driving circuit.

The stator core 51 is formed from magnetic material into a cylindrical shape to be an electromagnet by being magnetized when the solenoid coil 49 is energized. The stator core 51 has the attracting portion 60 on the way of the cylindrical portion to attract the moving core 6 to the one side in the axial direction. The stator core 51 has a closed portion on one side of the cylindrical portion in the axial direction and an opening portion on the other side of the cylindrical portion in the axial direction. An inner diameter of a left portion of the cylindrical portion of the stator core 51 with respect to the attracting portion 60 is larger than an inner diameter of a right portion of the cylindrical portion with respect to the attracting portion 60. The piece 53 is airtightly fitted to an inner circumferential portion of the left portion with respect to the attracting portion 60, to sandwich a sealing member such as an O-ring therebetween. An inner circumferential portion of the right portion of with respect to the attracting portion 60 serves as the sliding bore (moving core guiding portion) 61 that slidably supports an outer circumferential portion of the moving core 6. In the opening portion of the stator core 51, an annular air passage 62 is formed between a left end face of the bellows member 9 (and the retainer 8) and a right end face of the moving core 6. Further, In the inner circumference of the cylindrical portion of the stator core 51, the spring chamber 63 is formed between a left end face of the moving core 6 and a right end face of the piece 53 to install the return spring 38 therein. An axial hole 65 is formed in the closed portion of the stator core 51 to penetrate the closed portion in the axial direction.

The piece 53 acts as a limiting portion to limit an axial traveling distance of the moving elements including the first and second valves 3, 4, the moving core 6, the valve shaft 7 and so on. The piece 53 has an opening portion at one side of its cylindrical portion in the axial direction, and a closed portion at the other side of its cylindrical portion in the axial direction. A leading end face (right end face in the drawing) of the closed portion of the piece 53 is provided with a limiting face that is engaged with the left end face of the moving core when the moving elements are moved to the one side in the axial direction at most (when the lift amount of the moving elements reaches to the maximum), to prevent the moving elements from traveling further to the side to open the valve. A rubber cushion 66, which is formed from a rubber elastic body, is fitted to or rubber molded on a through hole penetrating the closed portion of the piece 53 in the axial direction, to absorb an impact when the moving core 6 comes in contact and to reduce the contact noise of the moving core 6. The piece 53 installs a filter 56, a jet 57 and another filter 58 in an inner space 67 thereof. A side wall portion of the piece 53 is provided with a communication hole 68 to communicate the spring chamber 63 that is provided at a proximity to the attracting portion 60 of the stator core 51 and the inner space 67 of the piece 53. On a central axis of the jet 57 is formed an aperture portion (air orifice, not shown) to reduce a passage cross-sectional area of the inner space 67 of the piece 53. The filters 56, 58 are formed from a ring-shaped frame body that has an opening portion therein, a mesh filter element that is fitted to the opening portion of the frame body, and so on. Then, the filters 56, 58 captures foreign matters such as dust particles, abrasion powder and the like that enter into the inner space 67 of the piece 53, to prevent the foreign matters from blocking the aperture portion of the jet 57.

The resin molded member 59 is integrally formed from thermoplastic resin such as polybutylene telephthalate (PBT), polyphenylene sulfide (PPS) or polyamide resin (PA), for example. The resin molded member 59 is disposed radially outside the coil portion of the solenoid coil 49 and the coil bobbin 54. Inside the resin molded member 59 is formed the yoke 52 by insert molding, and on an inner circumference of the resin molded member 59 is fixed the magnetic plate 50. The other axial end portion (right end portion in the drawing)

of the resin molded member 59 is provided with an annular connection end face, which is connected with the connection end face of the housing 2. The resin molded member 59 is provided with a round pipe-shaped portion 70 that has a pressure release hole 69 to smooth the opening/closing motions (reciprocating motions in the axial direction) of the first valve 3, the moving core 6, the valve shaft 7 and the bellows member 9. The hose 34 is connected to the round pipe-shaped portion 70 to communicate the pressure release hole 69 that opens at one end side of the electromagnetic driving portion 5 in the axial direction and the pressure release hole 35 that opens on the way of the bypass flow passage 23. On the outer circumferential portion of the resin molded member 59 is integrally formed an attachment stay portion 72, which is screw-fastened to a ceiling wall of the fuel tank 12 by a fastening part such as a fastening bolt, which is inserted in a through hole of the cylindrical collar 71.

When the cylindrical bellows portion 10 of the bellows member 9 is shrunk, the air passage formed in the electromagnetic driving portion 5 serves a first air passage that extends from the opening portion of the stator core 51 (the air passage 62) via a clearance formed between the sliding bore 61 of the stator core 51 and the outer circumference of the moving core 6, the spring chamber 63 provided at a proximity to the attracting portion 60 of the stator core 51, the communication hole 68 of the piece 53, the inner space 67 of the piece 53, the filter 56, the aperture hole of the jet 57, the filter 58 and the axial hole 65 of the stator core 51 to the pressure release hole 69 of the round pipe-shaped portion 70 of the resin molded member 59. When the cylindrical bellows portion 10 of the bellows member 9 is extended, the air passage formed in the electromagnetic driving portion 5 serves as a second air passage of which the gas flow direction is opposite from that of the first air passage.

Figure 4:
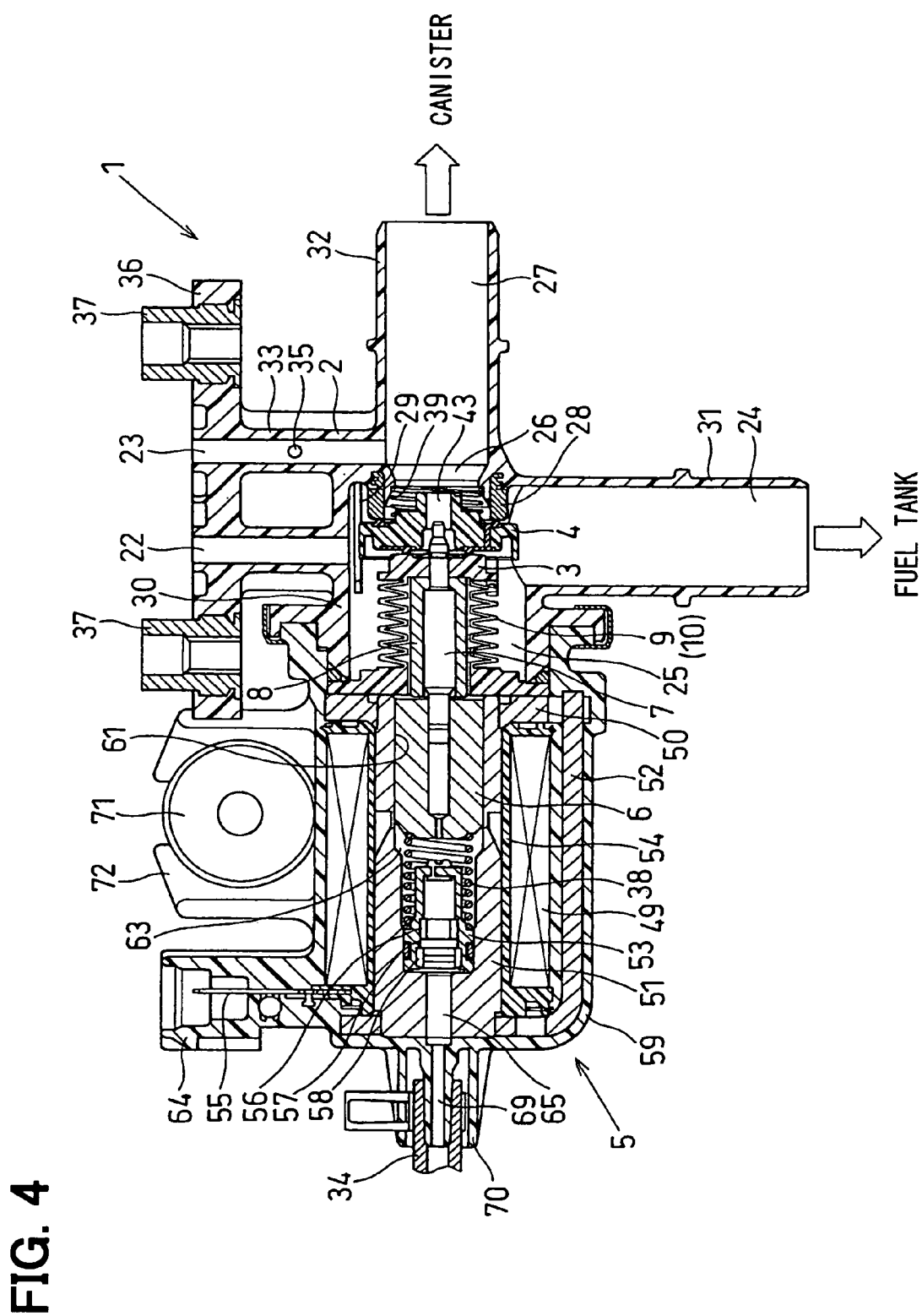
FIG. 4 is a cross-sectional view showing an entire construction of the electromagnetic valve according to the first embodiment.

In the first embodiment, the valve shaft 7 is formed from a cylindrical metal shaft that is formed from metallic material, and a retainer 8 that is fitted to and supported by an outer circumference of the metal shaft. The valve shaft 7 is installed on the central axis of the bellows member 9 to pass through the bellows member 9 in the axial direction. As shown in FIGS. 1 and 4, the valve shaft 7 is a round bar-shaped shaft part that extends straight from the first fitting bore 41 of the moving core 6 to the communication passage 43 (and the depressed portion 46) of the second valve 4 in a valve-closing operation time of the electromagnetic valve 1. The valve shaft 7 is positioned on a central axis of the cylindrical portion 30 of the housing 2. The valve shaft 7 is provided with a large diameter portion in a central portion thereof in the axial direction. The retainer 8 is fitted to and supported by the large diameter portion. Further, the valve shaft 7 is provided with a first small diameter portion in one end portion at the side of the electromagnetic driving portion) than the large diameter portion in the axial direction. The first small diameter portion is press-fitted into the first fitting bore 41 of the moving core 6. Furthermore, the valve shaft 7 is provided with a second small diameter portion in the other end portion at the side of the valve seat of the housing 2 than the large diameter portion in the axial direction. The second small diameter portion is press-fitted into the second fitting bore 42 of the first valve 3. In the drawings, the first small diameter portion of the valve shaft 7 is a portion protruding leftward from a conically-shaped left end face of the large diameter portion, and the second small diameter portion of the valve shaft 7 is a portion protruding rightward from an annular right end face of the large diameter portion. The first and second small diameter portions have diameters smaller than a diameter of the large diameter portion. A leading end portion of the second small diameter portion of the valve shaft 7 protrudes to the other side than the depressed portion 45, which is provided on the annular right end face of the first valve 3, in the axial direction. A flange portion (or an engaging groove) is provided on an outer circumference of this protruding portion of the second small diameter portion of the valve shaft 7 to be engaged with the wave washer 44.

The retainer 8 is integrally formed from resinous material such as thermoplastic resins as polybutylene terephthalate (PBT), polyphenylene sulfide (PPS) and polyamide resin (PA). The retainer 8 is loose-fitted or transition-fitted to an outer circumferential portion of the large diameter portion of the valve shaft 7 in an inner space of the bellows member 9, which is a cylindrical space extending from the annular end face on the left side of the first valve 3 to the opening end of the bellows member 9. Alternatively, the retainer 8 may be integrally formed with the valve shaft 7 by insert molding the valve shaft 7 in an inside of the retainer 8. In the retainer 8 is formed a non-deformable cylindrical sleeve portion 73 that has a fitting hole fitted to an outer circumference of the large diameter portion of the valve shaft 7. One end of the sleeve portion 73 in the axial direction is opened, and the other end of the sleeve portion 73 in the axial direction is closed. In the closed portion of the sleeve portion 73 is formed a fitting hole that is fitted to an outer circumference of a second small diameter portion of the valve shaft 7.

The bellows member 9 is integrally formed from the material as same as the first valve 3. The bellows member 9 is installed in the valve chamber 25 of the housing 2 to surround the retainer 8. The cylindrical bellows portion 10 of the bellows member 9 has a waved cross-sectional shape in the axial direction in which ridge portions and trough portions are alternately and repeatedly arranged in the axial direction. The cross-sectional shape of the ridge portion of the cylindrical bellows portion 10 in the axial direction is approximately V-shaped. The cross-sectional shape of the trough portion of the cylindrical bellows portion 10 in the axial direction is approximately trapezoidal. An annular flange portion 74 is integrally formed on the outer circumference of the one axial end of the bellows member 9. The flange portion 74 serves as a fitting seat fitted on the housing 2 and on the electromagnetic driving portion 5. The one end face (tapered face) of the cylindrical portion 30 of the housing 2 and the other end face (annular end face) of the magnetic plate 50 of the electromagnetic driving portion 5 sandwiches and supports the flange portion 74 therebetween via a sealing member such as an O-ring.

In the first embodiment, one end of the bellows member 9 is opened at the one side in the axial direction, for example, at the side of the electromagnetic driving portion 5, and the other end of the bellows member 9, which is opposite from an opening portion 75, is closed at the other side in the axial direction, for example, at the side of the valve seat of the housing 2 or at the side of the valve seat portion of the first valve. The opening portion 75 of the bellows member 9 is at the one side in the axial direction with respect to the cylindrical bellows portion 10 of the bellows member 9, and the closed portion of the bellows member 9 is at the other side in the axial direction with respect to the cylindrical bellows portion 10. Thus, the cylindrical bellows portion 10 of the bellows member 9 is disposed between the opening portion 75 and the closed portion of the bellows member 9. In the first embodiment, the closed portion of the bellows member 9 serves as the above-mentioned first valve (valve element) 3. The opening portion 75 of the bellows member 9 opens at the opposite side in the axial direction from the rubber seat portion of the molded rubber 48 of the second valve 4 (the valve seat portion of the second valve 4), that is, at the side of the electromagnetic driving portion 5. The opening portion 75 of the bellows member 9 serves as a cylindrical air passage that communicates the inner space of the bellows member 9 with the canister-side fluid passage 27 outside of the bellows member 9, via an inner space of the electromagnetic driving portion 5, the hose 34, the pressure release hole 35 and the bypass flow passage 23. The cylindrical bellows portion 10, which forms a principal portion of the bellows member 9, is provided between the opening portion 75 of the bellows member 9 and the closed portion of the bellows member 9 (the first valve 3). The cylindrical bellows portion 10 extends and shrinks in the axial direction in accordance with the intake and emission of the gas such as vaporized fuel between the inside and outside of the bellows through the opening portion 75.

The cylindrical bellows portion 10 of the bellows member 9 and the sleeve portion 73 of the retainer 8 define a cylindrical inner space (hereinafter referred to as the inner space of the cylindrical bellows portion 10) therebetween. A volume in the inner space of the cylindrical bellows portion 10 changes in accordance with the extending and shrinking operations of the cylindrical bellows portion 10 of the bellows member 9. The inner space of the cylindrical bellows portion 10 includes a radially outside space (hereinafter referred to as the radially outside space of the cylindrical bellows portion 10), of which a volume change in accordance with the axial extending and shrinking operations of the cylindrical bellows portion 10 is relatively large, the radially inside space (hereinafter referred to as the radially inside space of the cylindrical bellows portion 10), of which a volume change in accordance with the axial extending and shrinking operations of the cylindrical bellows portion 10 is relatively small, and so on. The ridge and trough portions of the cylindrical bellows portion 10 partitions the radially outside space of the cylindrical bellows portion 10 into a plurality of annular shaped spaces 76 (six annular shaped spaces 76 in the first embodiment). The radially inside space of the cylindrical bellows portion 10 is a cylindrical space or an air passage 77 that communicates a plurality of the annular shaped spaces 76 with the opening portion 75 of the bellows member 9.

In the first embodiment, in the inner space of the cylindrical bellows portion 10 of the bellows member 9 is provided a plurality of aperture portions 91 (five aperture portions 91 in the first embodiment), which has a passage cross-sectional area quite smaller than the maximum cross-sectional area in the inner space of the cylindrical bellows portion 10 of the bellows member 9, that is, than a ring-shaped opening cross-sectional area provided between the inner circumference of the plurality of ridge portions of the cylindrical bellows portion 10 and the outer circumference of the sleeve portion 73 of the retainer 8. The aperture portions 91 are disposed in a line in an axial direction between inner circumferential faces of the trough portions of the cylindrical bellows portion 10 of the bellows member 9 and the outer circumferential face of the sleeve portion 73 of the retainer 8. The aperture portions 91 are formed in approximately annular shapes to decrease a passage cross-sectional area of the air passage 77, by partially blocking a radially inside portion of the air passage 77 without changing the inner diameter of the plurality of trough portions of the cylindrical bellows portion 10 of the bellows member 9. An annular clearance between the inner circumference of the plurality the trough portions of the cylindrical bellows portion 10 of the bellows member 9 and the outer circumference of the sleeve portion 73 of the retainer 8 is set to 0.2 mm to 1.0 mm, for example.

In the first embodiment, between the opening portion 75 of the bellows member 9 and the sleeve portion 73 of the retainer 8 is provided one aperture portion 92, which has a passage cross-sectional area quite smaller than the maximum cross-sectional area in the inner space of the cylindrical bellows portion 10 of the bellows member 9, that is, than a ring-shaped opening cross-sectional area provided between the inner circumference of the plurality of ridge portions of the cylindrical bellows portion 10 and the outer circumference of the sleeve portion 73 of the retainer 8. The aperture portion 92 is provided between an inner circumference of the flange portion 74 of the bellows member 9 and an outer circumference of the sleeve portion 73 of the retainer 8. The one aperture portion 92 is formed in approximately annular shape to decrease a passage cross-sectional area of the opening portion 75 of the bellows member 9, by partially blocking a radially inside portion of the opening portion 75 of the bellows member 9 without changing the inner diameter of the inner circumference of the flange portion 74 of the bellows member 9. An annular clearance between the opening portion 75 of the bellows member 9 and the sleeve portion 73 of the retainer 8 is set to 0.2 mm to 1.0 mm, for example.

In the following are described actions of the electromagnetic valve 1 according to the first embodiment of the present invention, referring to FIGS. 1 to 4.

When the solenoid coil 49 is energized, the solenoid coil 49 generates magnetomotive force to magnetize the magnetic plate 50, the stator core 51, the yoke 52 and the moving core 6. Thus, the moving core 6 is attracted to the attracting portion 60 of the stator core 51, so that the first valve 3, which is fixed via the valve shaft 7 to the moving core 6, moves to the one side (leftward in the drawing) in the axial direction against the spring force of the return spring 38 to shrink the cylindrical bellows portion 10 of the bellows member 9 in the axial direction.

When the first valve 3 moves to the one side in the axial direction, the ridge and trough portions of the cylindrical bellows portion 10 of the bellows member 9 is shrunk in the axial direction. Thus, the radially outer portion of the inner space of the cylindrical bellows portion 10 of the bellows member 9, that is, a plurality of the annular shaped spaces 76 in the cylindrical bellows portion 10, which is partitioned by the ridge and trough portions, decreases its volume. Accordingly, the gas such as vaporized fuel that is filled in the variable volume spaces 76 is pressurized, to be pushed out of the variable volume spaces 76 to the radially inner portion of the inner space of the cylindrical bellows portion 10, that is, to the air passage 77.

The gas flown into or filled in the air passage 77 is pushed through a plurality of the aperture portions 91 and one aperture portion 92 out of the opening portion 75 of the bellows member 9 to an outer portion of the bellows member 9 (the air passage in the electromagnetic driving portion 5 such as the air passage 62 that is provided at the opening portion of the stator core 51). In this regard, the passage resistance when the gas flows through a plurality of the aperture portions 91 and the one aperture portion 92 decreases the traveling speed of the first valve 3, the moving core 6, the valve shaft 7 and the retainer 8 to the one side in the axial direction. Thus, the contact sound that is generated by the closed portion of the moving core 6 coming in contact with the rubber cushion 66 that is provided on the limiting face of the piece 53, that is, the operational noise of the electromagnetic valve 1 is reduced.

The first valve, which is fixed via the valve shaft 7 to the moving core 6, moves to the one side (leftward in the drawing) in the axial direction against the spring force of the return spring 38. Accordingly, the annular end face on the right side of the first valve 3 is lifted off the rubber seat portion of the molded rubber 48, which is mold formed on the first circumferential groove on the left side of the second valve 4, to open the communication passage 43, which is formed in the second valve 4. Then, the communication passage 43 of the second valve 4 communicates the tank-side fluid passage 24 and the valve chamber 25, which are at upstream side (at the side of the fuel tank 12) with respect to the valve seat of the housing 2 in the flow direction of the fluid such as vaporized fuel, with the valve hole 26 and the canister-side fluid passage 27, which are at downstream side (at the side of the canister 13) with respect to the valve seat of the housing 2 in the flow direction of the fluid such as vaporized fuel. Thus, the pressure at the side of the fuel tank 12 (the pressure in the tank-side fluid passage 24 and in the valve chamber 25) gradually decreases to become equal to the pressure at the side of the canister 13 (the pressure in the valve hole 26 and in the canister-side fluid passage 27).

In this regard, the valve-opening pressure of the second valve 4 is set based on a relation between pressure-receiving force (the product of seal diameter and pressure acting in the valve-closing direction) that acts on the left annular end face (pressure-receiving face) of the second valve 4, and the spring force of the coil spring 39. Thus, when the pressure at the side of the fuel tank 12, or the pressure in the tank-side fluid passage 24 and in the valve chamber 25 decreases to the valve-opening pressure, the spring force of the coil spring 39 opens the second valve 4. In this time, the second valve 4 moves to the one side in the axial direction until the rubber seat portion of the molded rubber 48 comes in contact with the right annular end face of the first valve 3. Thus, the first and second valves 3, 4 integrally lifts off the valve seat of the housing 2, keeping a state that the first and second valves 3, 4 are in intimate contact with each other to block the communication passage 43, which is formed in the second valve 4.

Accordingly, the rubber seal portion of the molded rubber 48, which is mold formed on the second circumferential groove on the right side of the second valve 4, is lifted off the valve seat of the housing 2, especially off the annular end face of the valve seat portion 28, so that the valve hole 26, which is formed on the valve seat of the housing 2 fully opens. Then, the fluid such as vaporized fuel, which is vaporized (volatilized) in the fuel tank 12, flows through an upstream side portion of the connection pipe 15 into the electromagnetic valve 1. The fluid such as vaporized fuel further flows from the inlet port via the tank-side fluid passage 24, the valve chamber 25, the valve hole 26, the canister-side fluid passage 27 and the outlet port into a downstream portion of the connection pipe 15, and is adsorbed by an adsorbent body in the canister 13.

When the current supply to the solenoid coil 49 is turned off, the solenoid coil 49 is demagnetized and the attraction force of the attracting portion 60 of the stator core 51 extinguishes. Thus, the spring force of the return spring 38 moves the first and second valves 3, 4, the moving core 6, the valve shaft 7 and the retainer 8 to the other side (rightward in the drawing) in the axial direction, extending the cylindrical bellows portion 10 of the bellows member 9 in the axial direction.

When the first and second valves 3, 4 integrally move to the other side in the axial direction, the ridge and trough portions of the cylindrical bellows portion 10 of the bellows member 9 extends in the axial direction. Thus, the radially outer portion of the inner space of the cylindrical bellows portion 10 of the bellows member 9, that is, the plurality of the variable volume spaces 76, which are partitioned by the ridge and trough portions of the cylindrical bellows portion 10, increases its volume. Accordingly, the gas filled in the outer portion of the bellows member 9, that is, in the air passage in the electromagnetic driving portion 5 such as the air passage 62 provided at the opening portion of the stator core 51 is sucked from the opening portion 75 of the bellows member 9 to the inner space of the bellows member 9.

In this time, the gas reached the opening portion 75 of the bellows member 9 further flows through the one aperture portion 92 and a plurality of the aperture portions 91 and the air passage 77 and is sucked into the variable volume spaces 76 in the cylindrical bellows portion of the bellows member 9, which are partitioned by the ridge and trough portions. In this regard, the passage resistance when the gas passes through the one aperture portion 92 and a plurality of the aperture portions 91 decreases the traveling speed of the first and second valves 3, 4, the moving core 6, the valve shaft 7 and the retainer 8 to the other side in the axial direction. Thus, the valve-seating sound that is generated by the rubber seal portion of the molded rubber 48 of the second valve, which is in intimate contact with the first valve 3, seating on the valve seat of the housing 2, especially on the annular end face of the valve seat portion 28, that is, the operational noise of the electromagnetic valve 1 is reduced.

Thus, the rubber seal portion of the molded rubber 48 of the second valve 4 seats on the valve seat of the housing 2, especially on the annular end face of the valve seat portion 28, to close the valve hole 26 completely. Accordingly, the tank-side fluid passage 24 and the valve chamber 25 at the side of the fuel tank 12 are sealed from the canister-side fluid passage 27 at the side of the canister 13. As a result, during a traveling time of the vehicle such as automobile and just before refueling the fuel tank 12, the electromagnetic valve 1 keeps opening for a predetermined period of time, and the electromagnetic valve 1 is kept closed in the other times.

The relief valve 11 opens when the valve element is lifted off the valve seat when the pressure at the side of the fuel tank 12 becomes larger than a predetermined value, that is, than the pressure at the side of the canister 13 to displace the diaphragm against the spring force of the spring and to move the valve shaft connecting the diaphragm with the valve body in the axial direction. The relief valve 11 closes when the valve element is seated on the valve seat when the pressure at the side of the fuel tank 12 becomes smaller than the predetermined value, that is, than the pressure at the side of the canister 13, so that the spring force of the spring displaces the diaphragm to move the valve shaft in the axial direction.

Accordingly, when the first and second valves 3, 4 of the electromagnetic valve 1 close the valve hole 26 and the pressure in the fuel tank 12 increases in accordance with a vaporization of the fuel in the fuel tank 12, the fluid such as vaporized fuel that has flown into the electromagnetic valve 1 further flows through the inlet port, the tank-side fluid passage 24, the valve chamber 25, the bypass flow passage 22, the valve hole of the relief valve 11, the bypass flow passage 23, the canister-side fluid passage 27 and the outlet port to the canister 13. Thus, it is possible to prevent the fluid such as vaporized fuel from leaking at the pipe connection portion due to pressure increase in the fuel tank 12.

As described above, the electromagnetic valve 1 installs the first and second valves 3, 4 that are subjected to both positive and negative pressures on their surfaces and the bellows member 9 in which the cylindrical bellows portion 10 is subjected to positive and negative pressures on the surfaces of the ridge and trough portions. The positive pressure acts when the pressure in the fuel tank 12 is increased in accordance with the temperature increase around the fuel tank 12 to volatilize the liquid fuel in the fuel tank 12. The negative pressure acts when the pressure in the fuel tank 12 is decreased in accordance with the temperature decrease around the fuel tank 12 in the traveling time of the vehicle, or when fuel pump installed in the fuel tank 12 sucks the liquid fuel in the fuel tank 12.

In the first embodiment, the axial extending and shrinking operation of the cylindrical bellows portion 10 of the bellows member 9, which can be used under the alternative positive and negative pressures, is provided with the damper effect, to reduce the operational noise of the electromagnetic valve 1. The damper effect is realized by providing the plurality of aperture portions 91 and the one aperture portion 92 in the inner space of the cylindrical bellows portion 10 of the bellows member 9 and in the space between the opening portion 75 of the bellows member 9 and the sleeve portion 73 of the retainer 8, especially in the cylindrical space of which the volume change in accordance with the axial extension and shrinkage of the cylindrical bellows portion 10 of the bellows member 9 is relatively small.

The aperture portions 91 and the one aperture portion 92 have quite small passage cross-sectional area relative to the opening cross-sectional area between the inner circumference of the plurality of trough portions of the cylindrical bellows portion 10 of the bellows member 9 and the outer circumference of the sleeve portion 73 of the retainer 8. Thus, in a valve-opening operation time of the electromagnetic valve 1, the passage resistance, which is applied to the gas compressed in accordance with the shrinkage of the cylindrical bellows portion 10 of the bellows member 9 and passing through a plurality of the aperture portions 91 and the one aperture portion 92, decreases the traveling speed of the moving core 6 to the one side in the axial direction. Accordingly, the electromagnetic valve 1 securely serves the damper effect in its valve-opening operation time, so that it is possible to reduce its operational noise due to the contact sounds of the closed portion of the moving core 6 coming in contact with the rubber cushion 66, or the limiting face of the piece 53.

In the valve-closing operation time of the electromagnetic valve 1, the passage resistance, which is applied to the gas such as vaporized fuel being discharged through the one aperture portion 92 and a plurality of the aperture portions 91, decreases the traveling speed of the first and second valves 3, 4 to the other side in the axial direction. Accordingly, the electromagnetic valve 1 securely serves the damper effect in its valve-closing operation time, so that it is possible to reduce its operational noise due to the contact sounds of the first and second valves 3, 4 seating on the valve seat of the housing 2, especially on the valve seat portion 28.

Further, in the electromagnetic valve 1 according to the first embodiment, a plurality of the aperture portions 91 are provided in a line in the axial direction between the inner circumference of the trough portion of the cylindrical bellows portion 10 of the bellows member 9 and the outer circumference of the sleeve portion 73 of the retainer 8. Thus, it is possible to decrease the volume in the cylindrical bellows portion 10 of the bellows member 9, especially the volume at a portion where the volume change in accordance with the extension and shrinkage of the cylindrical bellows portion 10 of the bellows member 9 in the axial direction is relatively small. Accordingly, the compression ratio of the fluid, which is compressed in accordance with the shrinking operation of the cylindrical bellows portion 10 of the bellows member 9, increases, to improve the damper effect generated by the extending and shrinking operations of the cylindrical bellows portion 10 of the bellows in the axial direction.

Furthermore, in the electromagnetic valve 1 according to the first embodiment, the housing 2 installs the bellows member 9 that is not deteriorated nor broken by the use in the valve chamber 25 subjected to both the positive and negative pressures. Thus, the cylindrical bellows portion 10 of the bellows member 9 secures the durability and reliability equivalent to those of the diaphragm in the conventional electromagnetic valve, and the cylindrical bellows portion 10 of the bellows member 9 has a radial size as compact as that in the conventional electromagnetic valve. Accordingly, the extending and shrinking operations of the cylindrical bellows portion 10 of the bellows member 9 in the axial direction, which are linked with the reciprocating motions of the moving core 6 in the axial direction and the opening and closing operations of the first valve 3 in the axial direction, securely serves the damper effect without decreasing the durability and reliability of the electromagnetic valve 1 and without upsizing the housing 2 and/or the bellows member 9 of the electromagnetic valve 1.

Still further, in the electromagnetic valve 1 according to the first embodiment, the opening portion 75 of the bellows member 9 opens at the opposite side in the axial direction from the side of the valve seat of the first valve 3, for example, at the side of the electromagnetic driving portion 5. Thus, even when the first valve 3 is seated on the valve seat portion of the second valve 4 to block the communication passage 43, it is possible to prevent the opening portion 75 of the bellows member 9 from being blocked to secure the extending and shrinking operations of the cylindrical bellows portion 10 of the bellows member 9 in the axial direction. Accordingly, the electromagnetic valve 1 according to the first embodiment has fine control response performance and reliability of the first valve 3 and excellent durability and reliability of the bellows member 9, relative to the conventional electromagnetic valve in which the opening portion 75 of the bellows member 9 opens at the side of the valve seat portion of the second valve 4.

Second Embodiment

Figure 5:
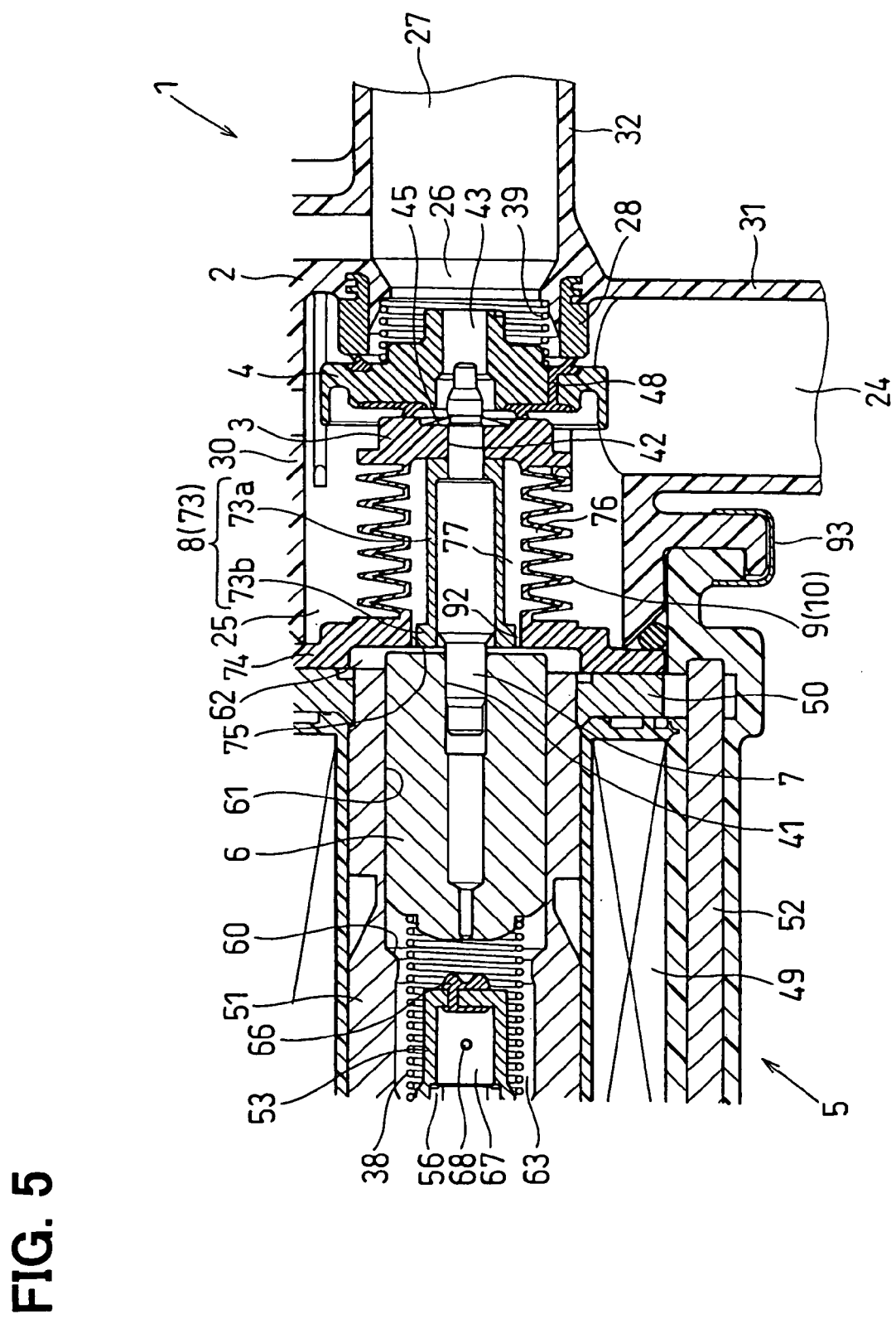
FIG. 5 is a cross-sectional view showing a principal portion of an electromagnetic valve according to a second embodiment of the present invention.

In an electromagnetic valve 1 according to a second embodiment shown in FIG. 5, an outer diameter of the sleeve portion 73 of the retainer 8 is partially decreased. That is, the sleeve portion 73 of the retainer 8 includes a small diameter portion 73a and a flange portion 73b having a diameter larger than that of the small diameter portion 73a. The small diameter portion 73a is at a right side (in FIG. 5) of a step of the sleeve portion 73 to face the inner circumference of the trough portion of the cylindrical bellows portion 10 of the bellows member 9. The flange portion 73b is at a left side (in FIG. 5) of the step of the sleeve portion 73 to face the inner circumference of the flange portion 74 or the opening portion 75 of the bellows member 9. Accordingly, the cylindrical air passage (radially inside space) 77, which is defined between the small diameter portion 73a of the sleeve portion 73 of the retainer 8 and the cylindrical bellows portion 10 of the bellows member 9, has a large inner volume relative to that in the first embodiment, and a plurality of the aperture portions 91 is not formed. As in the first embodiment, one aperture portion 92 is provided between the flange portion 73b of the sleeve portion 73 of the retainer 8 and the flange portion 74 or the opening portion 75 of the bellows member 9. Accordingly, the electromagnetic valve 1 according to the second embodiment serves substantially the same effects as in the first embodiment.

Third Embodiment

Figure 6:
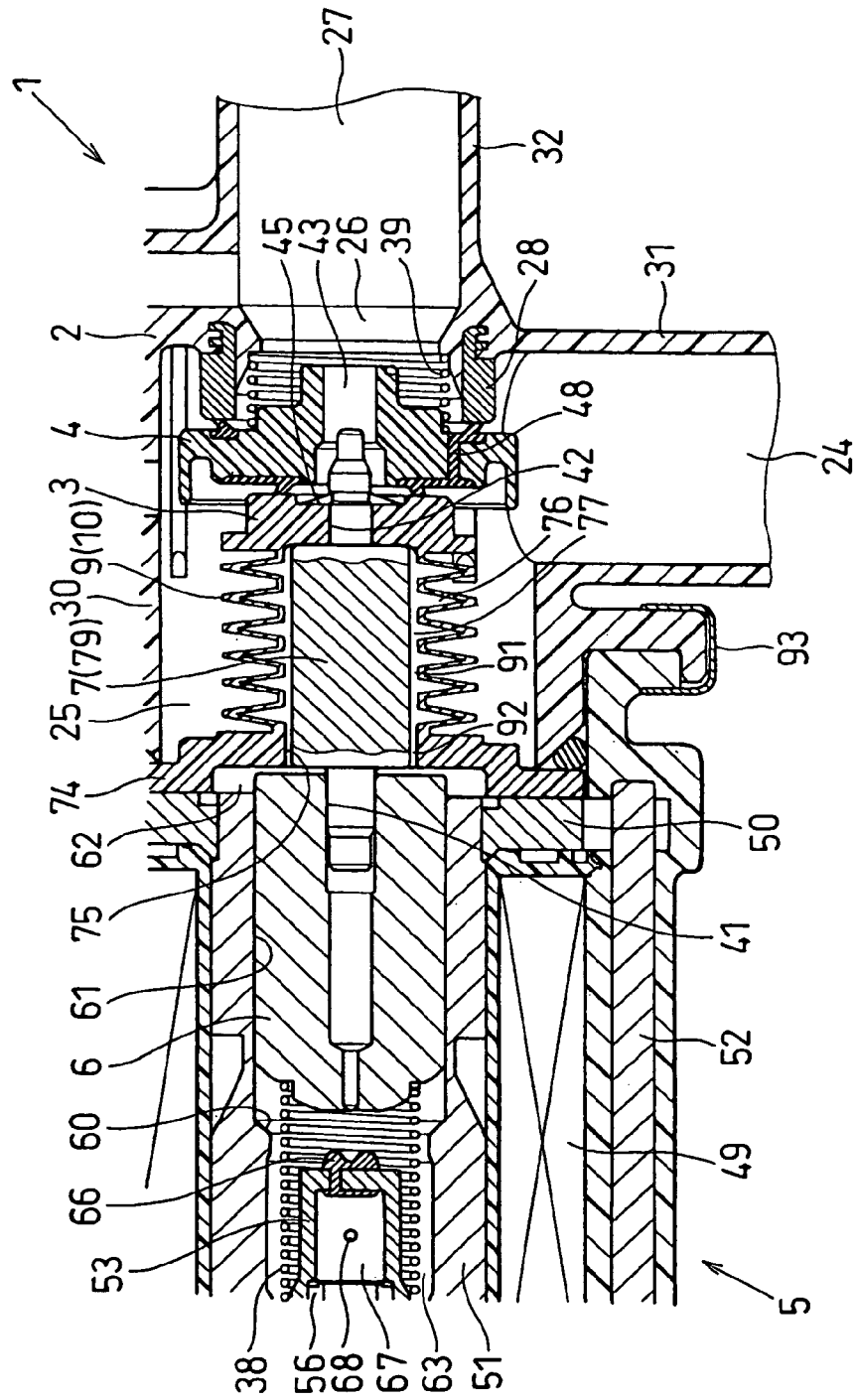
FIG. 6 is a cross-sectional view showing a principal portion of an electromagnetic valve according to a third embodiment of the present invention.

In an electromagnetic valve 1 according to a third embodiment shown in FIG. 6, an outer diameter of a large diameter portion 79 of the valve shaft 7 is large relative to that in the first embodiment. Accordingly, it is possible to decrease the inner volume of the cylindrical air passage (radially inside space) 77, which is defined between the large diameter portion 79 of the valve shaft 7 and the cylindrical bellows portion 10 of the bellows member 9, without the retainer 8 in the first embodiment. Thus, it is possible to provide the inner space of the cylindrical bellows portion 10 of the bellows member 9 with a plurality of the aperture portions 91. Further, it is possible to provide one aperture portion 92 between the opening portion 75 of the bellows member 9 and the large diameter portion 79 of the valve shaft 7. Accordingly, the electromagnetic valve 1 according to the third embodiment serves substantially the effects as in the first embodiment.

Fourth Embodiment

Figure 7:
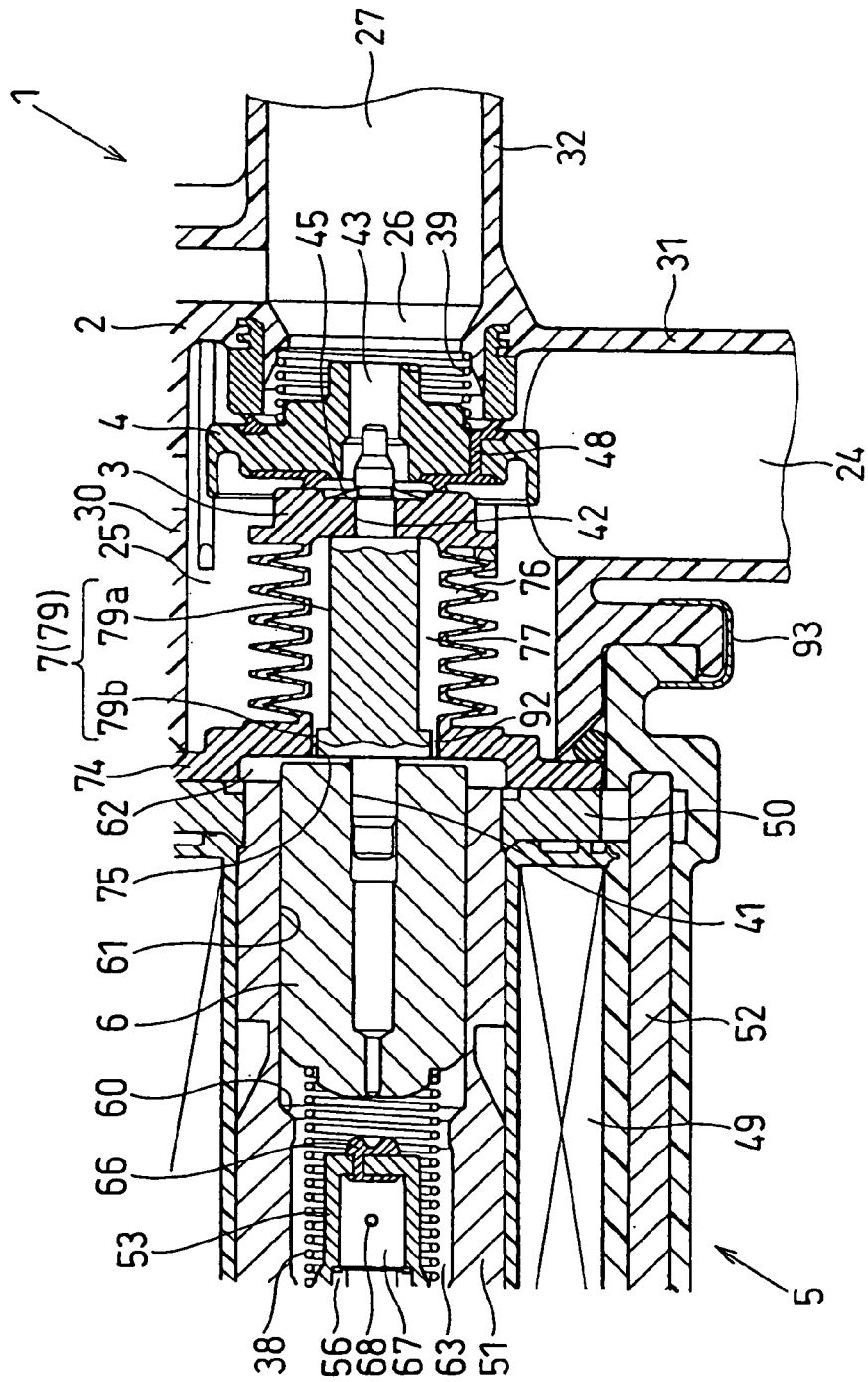
FIG. 7 is a cross-sectional view showing a principal portion of an electromagnetic valve according to a fourth embodiment of the present invention.

In an electromagnetic valve 1 according to a fourth embodiment shown in FIG. 7, an outer diameter of the large diameter portion 79 of the valve shaft 7 is partially decreased. That is, the large diameter portion 79 of the valve shaft 7 includes a small diameter portion 79a and a flange portion 79b having a diameter larger than that of the small diameter portion 79a. The small diameter portion 79a is at a right side (in FIG. 7) of a step of the large diameter portion 79 of the valve shaft 7 to face the inner circumference of the trough portion of the cylindrical bellows portion 10 of the bellows member 9. The flange portion 79b is at a left side (in FIG. 7) of the step of the large diameter portion 79 of the valve shaft 7 to face the inner circumference of the flange portion 74 or the opening portion 75 of the bellows member 9. Accordingly, the cylindrical air passage (radially inside space) 77, which is defined between the small diameter portion 79a of the large diameter portion 79 of the valve shaft 7 and the cylindrical bellows portion 10 of the bellows member 9, has a large inner volume relative to that in the first embodiment, and a plurality of the aperture portions 91 is not formed. As in the first embodiment, one aperture portion 92 is provided between the flange portion 79b of the large diameter portion 79 of the valve shaft 7 and the flange portion 74 or the opening portion 75 of the bellows member 9. Accordingly, the electromagnetic valve 1 according to the fourth embodiment serves substantially the same effects as in the first embodiment.

Modified Embodiments

In the above-described embodiments, the electromagnetic valve according to the present invention is applied to the electromagnetic valve 1 that is incorporated in the evaporative emission control system of a vehicle such as an automobile, especially to an electromagnetic tank-sealing valve. The present invention is not limited to this kind of electromagnetic valve, and may be applied to an electromagnetic valve in which the surfaces of at least the ridge and trough portions of the cylindrical bellows portion of the bellows is subjected to both positive and negative pressures. The electromagnetic valve according to the present invention is applicable not only to gas such as air, vaporized fuel, etc., but also to air including gas phase refrigerant, to liquid including water, fuel and liquid phase refrigerant, and to two-phase fluid (combination of air phase fluid and liquid phase fluid). Further, the electromagnetic valve according to the present invention may be configured so that the lift amount of the valve increases or decreases in accordance with an increase of voltage or current applied to the coil. In this case, the valve serves as the valve element of the electromagnetic flow amount control valve.

In the above-described embodiments, the electromagnetic valve according to the present invention is applied to a normally-closed electromagnetic opening/closing valve, in which the first valve 3 linked with the motion of the moving core 6 opens when the magnetomotive force of the solenoid coil 49 attracts the moving core 6 to the one side in the axial direction. However, the electromagnetic valve according to the present invention is also applicable to a normally-opened electromagnetic opening/closing valve, in which the valve linked with the motion of the moving core closes when the magnetomotive force of the coil of the electromagnetic driving portion attracts the moving core to the one side in the axial direction. In the above-described embodiments, not only the surfaces of the ridge and trough portions of the cylindrical bellows portion 10 of the bellows member 9 but also the surfaces of the first and second valves 3, 4 are subjected to the pressure condition in the valve chamber 25 and so on, to which both positive and negative pressures are applied. However, the electromagnetic valve according to the present invention is also applicable to a case in which the surfaces of the first and second valves 3, 4 are not subjected to the pressure condition of both positive and negative pressures.

In the above-described embodiments, the electromagnetic valve according to the present invention is applied to the electromagnetic valve 1 provided with the first valve 3, which serves as the valve element of the electromagnetic opening/closing valve that opens and closes the communication passage 43 of the second valve 4 by lifting off and seating on the rubber seat portion (valve seat portion) of the second valve 4, and the second valve, which serves as the valve element of a pressure-sensing valve that opens and closes the valve hole (fluid passage hole) 26 of the housing 2 by lifting off and seating on the valve seat (valve seat portion 28) of the housing 2. However, the electromagnetic valve 1 may adopt a valve that is driven by the magnetomotive force of a coil and acts as a valve element of an electromagnetic opening/closing valve that open and closes the valve hole (fluid passage hole) 26 of the housing 2 by lifting off and seating on the valve seat of the housing 2. In this case, the coil spring 39 is not necessary, so that it is possible to decrease the number of parts. It is allowable that the valve is integrally provided on the closed portion of the bellows member 9, and that the valve is not integrally provided on the closed portion of the bellows member 9.

In the above-described embodiments, the first valve 3 is integrally formed on the closed portion of the bellows member 9 from resinous material. However, the first valve 3 may be fixed on the closed portion of the bellows member 9 by screw-fastening and the like, cemented to the closed portion of the bellows member 9 by adhesive, or welded on the closed portion of the bellows member 9. Further, it is allowable that the first valve 3 is integrally provided on the closed portion of the bellows member 9, and that the first valve 3 is not integrally provided on the closed portion of the bellows member 9. For example, the closed portion of the bellows member 9 and the first valve 3 may be separately provided from each other, to fix the closed portion of the bellows member 9 and the first valve 3 independently on the valve shaft 7.

The number of the aperture portion 91 may be two or more, by forming an axial cross-section of the large diameter portion 79 of the valve shaft 7 or the sleeve portion 73 of the retainer 8 in a waved shape with alternately repeating ridge and trough portions at a portion facing the opening portion 75 of the bellows member 9, that is, the inner circumference of the flange portion 74. In this case, the diameters of the aperture portions 91, which are provided in the opening portion 75 of the bellows member 9, may be different from each other. The aperture portions 91 may be provided over an entire of an axial length of the opening portion 75 of the bellows member 9, and may be provided only in a part of the axial length of the opening portion 75 of the bellows member 9. In this case, the aperture portions 91 may be provided only in a central part of the axial length of the opening portion 75 of the bellows member 9, only in one axial end portion of the opening portion 75 of the bellows member 9 at the side of the electromagnetic driving portion 5, or only in the other axial end portion of the opening portion 75 of the bellows member 9.

The number of the aperture portion 92 may be further increased, by forming an axial cross-section of the large diameter portion 79 of the valve shaft 7 or the sleeve portion 73 of the retainer 8 in a waved shape with alternately repeating ridge and trough portions at a portion facing the inner circumference of the trough portions of the cylindrical bellows portion 10 of the bellows member 9. The diameters of the aperture portions 92, which are provided inside the trough portions of the cylindrical bellows portion 10 of the bellows member 9, may be different from each other.

The cylindrical bellows portion 10 of the bellows member 9 may be substituted by an ellipsoidal-sectioned cylindrical bellows portion, an oblong-sectioned cylindrical bellows portion, a rectangular-sectioned cylindrical bellows portion or a spiral cylindrical bellows portion.

Figure 8:
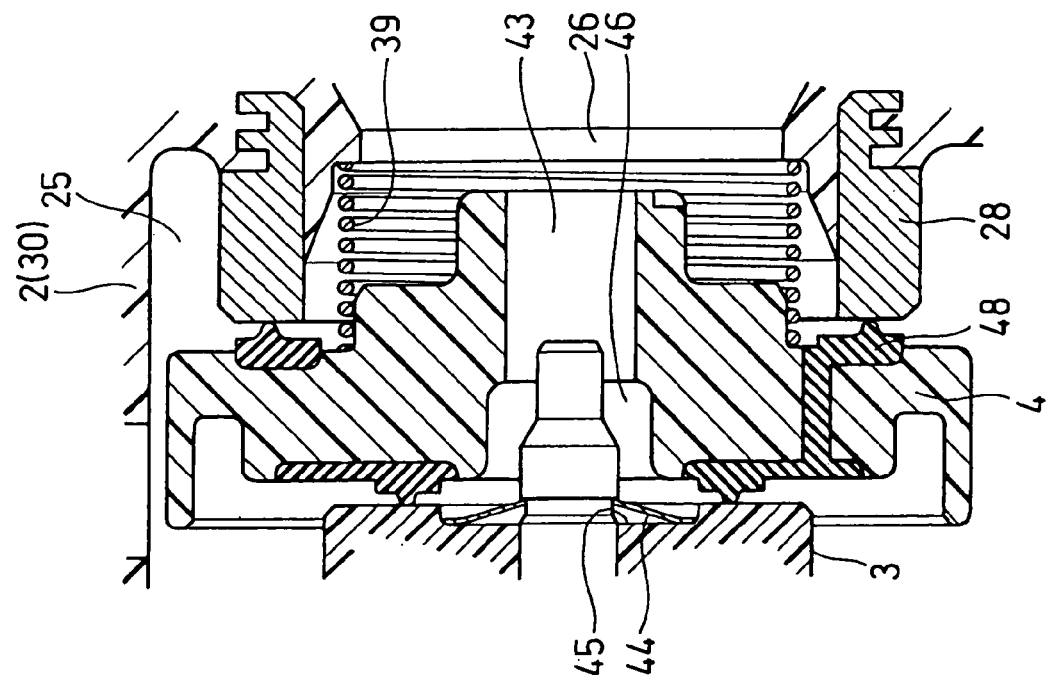
FIG. 8 is a cross-sectional view showing a principal portion of an electromagnetic valve according to a modified embodiment of the present invention.

In the above-described embodiments, the outer circumferential portion of the cylindrical portion 30 of the housing 2 and the inner circumference of the resin molded member 59 of the electromagnetic driving portion 5 is fitted to each other, and the flange portions of which are swaged by the metallic ring 93 by keeping them in intimate contacts with each other. However, it is allowable that the outer circumference of the cylindrical portion 30 of the housing 2 and the inner circumference of the resin molded member 59 of the electromagnetic driving portion 5 are fitted to each other and the flange portions of these are fixed by welding. The cylindrical portion 30 of the housing 2 and the cylindrical portion of the resin molded member 59 of the electromagnetic driving portion 5 may be integrally formed from resinous material. It is allowable that the cylindrical portion 30 of the housing 2 is not provided with the valve-sliding portion (especially with a plurality of the valve guides 29) (refer to FIG. 8). It is allowable that the second valve 4 is not provided with the fitting portion 47, or that the second valve 4 is not provided with the molded rubber 48. It is also allowable that the valve seat of the housing 2 is not provided with the valve seat portion 28, by forming the valve seat of the housing 2 from resinous material.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electromagnetic valve comprising:
a housing;
a valve member that is installed in the housing to be slidable in an axial direction of the housing to open and close a valve hole;
an electromagnetic driving portion provided with a moving core that is installed in the housing to be slidable in the axial direction and a coil that generates a magnetomotive force to attract the moving core to one side in the axial direction of the housing when it is energized;
a valve shaft that links a reciprocating motion of the moving core in the axial direction with a motion of the valve member; and
a bellows member that is installed in the housing to surround an outer circumference of the valve shaft and provided with a cylindrical bellows portion that extends and shrinks in the axial direction in accordance with an opening and closing operations of the valve member and with the reciprocating motions of the moving core, and a surface of the cylindrical bellows portion being subjected to both positive and negative pressures, wherein the cylindrical bellows portion and the valve shaft form a cylindrically shaped inner space therebetween, an inner volume of the inner space increasing and decreasing in accordance with extending and shrinking operations of the cylindrical bellows portion, the bellows member has an opening portion that communicates the inner space of the cylindrical bellows portion with an outer space of the cylindrical bellows portion, the valve shaft includes a shaft portion that links the motion of the moving core and the motion of the valve member and a cylindrical part that is fixed on an outer circumference of the shaft portion so as to cover an entire outer surface of the shaft portion radially inside the opening portion and the cylindrical bellows portion of the bellows member and to move together with the shaft portion, and the opening portion and a trough portion of the bellows member are opposed to an outer surface of the cylindrical part, so that the trough portion and the cylindrical part define a first narrow opening passage and the opening portion and the cylindrical part define a second narrow opening passage, respective passage cross-sectional areas of the first and second narrow opening passages being quite smaller than a maximum passage cross-sectional area of the inner space of the cylindrical bellows portion, wherein:
the bellows member has a closed portion to close the other end side portion thereof in the axial direction;
the housing has a cylindrically shaped valve seat in which a fluid passage hole is formed;
the valve member includes a first valve that opens by being attracted to the one side in the axial direction by the magnetomotive force of the coil and a second valve that opens by being urged to the one side in the axial direction by the urging force of a spring installed at a proximity to the valve seat of the housing when a pressure acting to close the second valve decreases to a predetermined value when the first valve is opened;
the second valve has a valve seat portion to seat the first valve thereon and a communication passage to be communicated with the fluid passage hole, the second valve being lifted off and seated on the valve seat of the housing to open and lose the fluid passage hole to serve as a valve element of a pressure-sensing valve;
the first valve is integrally provided in the closed portion of the bellows member to be lifted off and seated on the valve seat portion of the second valve to open and close the communication passage to serve as a valve element of an electromagnetic opening/closing valve; and
the opening portion of the bellows member opens to a side opposite from the valve seat portion of the second valve in the axial direction.

2. The electromagnetic valve according to claim 1, wherein positive and negative pressures alternately act on a surface of the cylindrical bellows portion.

3. The electromagnetic valve according to claim 1, wherein the valve shaft links the motion of the moving core in the axial direction with opening and closing motions of the valve member and with extending and shrinking motions of the cylindrical bellows portion of the bellows member. passage, 4. The electromagnetic valve according to claim 1, wherein the cylindrical bellows portion of the bellows member has a cross-sectional shape in the axial direction in which ridge portions and trough portions alternately repeats to form a plurality of the narrow inside passages in a line in the axial direction between an inner circumferential face of the trough portions and an outer circumferential face of the valve shaft.

5. The electromagnetic valve according to claim 1, wherein the cylindrical part is located inside of an inner circumferential face of the cylindrical bellows portion of the bellows member.

6. The electromagnetic valve according to claim 1, wherein the inner space in the cylindrical bellows portion includes a radially outer space in which volume change due to the extending and shrinking operations of the cylindrical bellows portion is relatively large, and a radially inner space in which volume change due to the extending and shrinking operations of the cylindrical bellows portion is relatively small.

\* \* \* \* \*